March 22, 1960 J. C. AGARWAL ET AL 2,929,703
METHOD AND APPARATUS FOR HANDLING GASES IN
A DIRECT REDUCTION PROCESS
Filed May 27, 1958
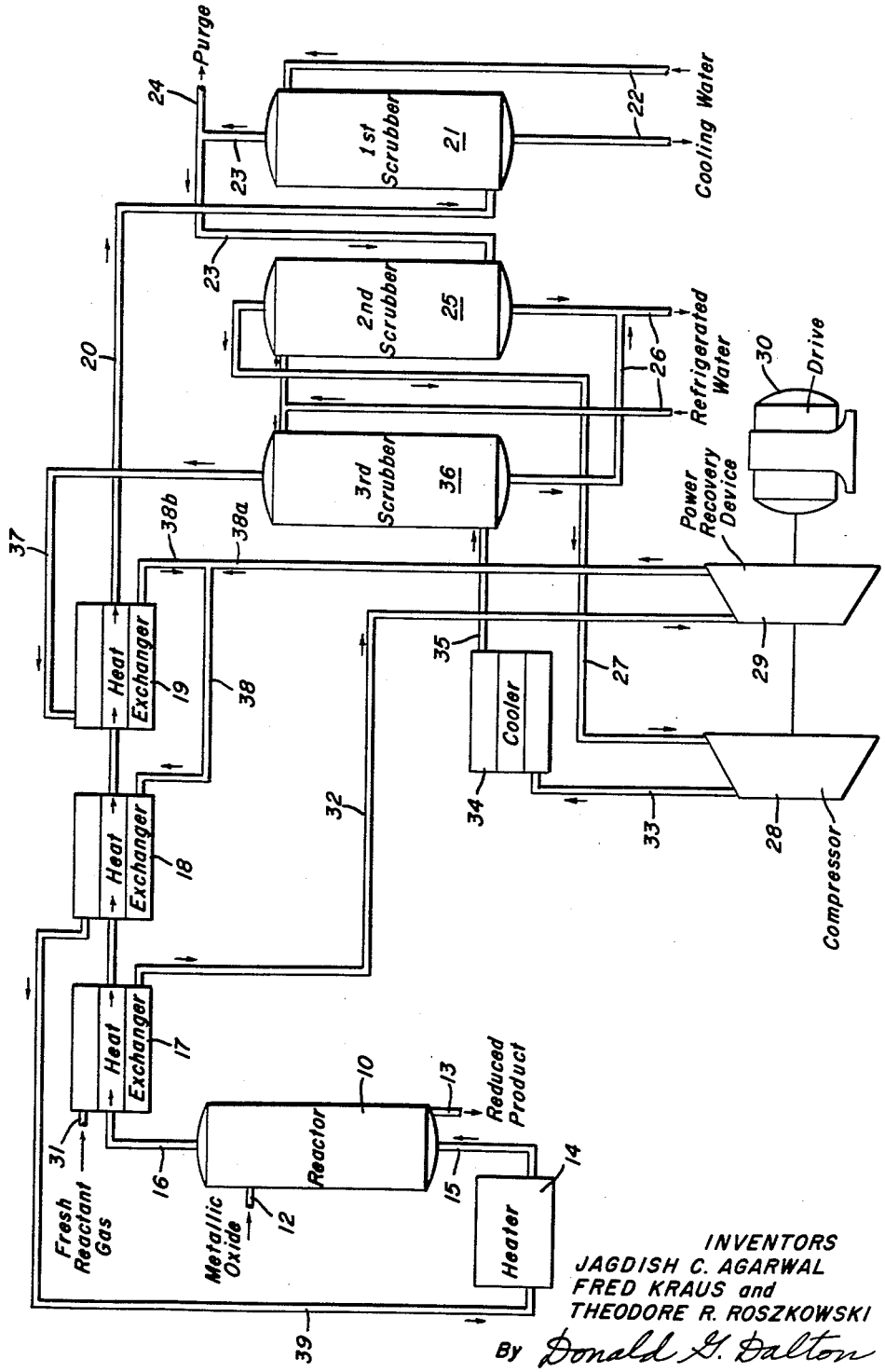
INVENTORS
JAGDISH C. AGARWAL
FRED KRAUS and
THEODORE R. ROSZKOWSKI
By Donald G. Dalton
Attorney

United States Patent Office 2,929,703
Patented Mar. 22, 1960

2,929,703

METHOD AND APPARATUS FOR HANDLING GASES IN A DIRECT REDUCTION PROCESS

Jagdish C. Agarwal, Verona, Pa., and Fred Kraus and Theodore R. Roszkowski, New Rochelle, N.Y.; said Agarwal assignor to United States Steel Corporation, a corporation of New Jersey, and said Kraus and Roszkowski assignors to The Lummus Company, New York, N.Y., a corporation of Delaware Application May 27, 1958, Serial No. 738,133

10 Claims. (Cl. 75—26)

This invention relates to an improved method and apparatus for handling gases in a continuous direct reduction process for metallic oxides.

Essentially such processes involve continuously contacting metallic oxide fines with a reducing gas at a suitable elevated reaction temperature. Our invention is particularly applicable to processes in which the oxide is iron oxide, the reaction temperature is attained by preheating the oxide and gas, the reactions take place in fluidized bed reactors, and the reducing gas is mainly hydrogen, but optionally can contain carbon monoxide in an amount up to about 25 percent by volume. Nevertheless the invention is not thus limited. As reduction proceeds in this type of process, the reductants hydrogen and carbon monoxide, if present, are consumed, while their oxidation products water and carbon dioxide build up, but substantial quantities of reductant remain in the final off-gas from the reactors. Consequently the usual practice is to regenerate this off-gas by removing oxidation products and then recycle regenerated gas. Water is removed by cooling the off-gas sufficiently so that its vapor condenses, while carbon dioxide, if present, can be removed in a suitable absorber. Usually a portion of the off-gas is purged from the system to limit build-up of inerts, mainly nitrogen. Fresh reducing gas is added to the regenerated gas to make up for the portions consumed and purged.

Off-gas of course leaves the reactors at a relatively high temperature, and its sensible heat can be conserved by using such off-gas to heat incoming fresh reducing gas indirectly in a heat exchanger. Fresh gas commonly is produced under high pressure, and the energy which this pressure represents can be conserved by using such fresh gas as motive fluid in a power recovery device, such as a turbine, which assists in driving a compressor for the regenerated off-gas. An earlier application of the present co-inventor Agarwal, Serial No. 609,025, filed September 10, 1956, describes and claims several arrangements for thus using this energy.

An object of the present invention is to provide an improved gas handling method and apparatus which utilize more efficiently energy represented by sensible heat and pressure in the gases, as well as producing a regenerated gas of enhanced reducing power.

A further object is to provide an improved gas handling method and apparatus in which heat is exchanged between the off-gas and the fresh and regenerated gases in multiple stages, thereby utilizing its sensible heat more efficiently.

A further object is to provide an improved gas handling method and apparatus in which off-gas is cooled to as low as 60° F. to remove water more completely, a procedure which enhances the reducing power of the gas beyond reasonable expectations.

In the drawing, the single figure is a simplified schematic flowsheet of our method and apparatus.

The figure shows a reactor 10 of any conventional construction in which ascending gas currents can maintain beds of finely divided solids in a fluidized state. For simplicity we show only a single reaction, but it is apparent this reactor can contain a plurality of beds in series, either in a single vessel appropriately partitioned or in separate vessels, and the reactions therein can take place in steps. Metallic oxide fines, preheated to a suitable temperature (about 1500 to 1800° F. for iron oxide), feed continuously to the reactor 10 through a feeder indicated schematically at 12. A reduced product continuously leaves the reactor through a discharge indicated schematically at 13. Reducing gas, mainly hydrogen, but which optionally can contain up to about 25 percent by volume carbon monoxide, is preheated to a suitable temperature (about 1300 to 1600° F. for iron oxide) in a heater 14 of any conventional construction, and is introduced continuously to the reactor through an inlet line 15. Off-gas leaves the reactor via an outlet line 16, and is at an elevated temperature similar to that at which the reduction is carried out (about 1200 to 1400 for iron oxide) and a pressure of about 0 to 50 p.s.i.g.

In accordance with our invention (as shown), the outlet line 16 carries off-gas from reactor 10 through heat exchangers 17, 18 and 19 of any conventional construction. These heat exchangers utilize sensible heat in the off-gas to heat fresh reducing gas and regenerated gas in multiple stages, as hereinafter explained. A line 20 carries off-gas, now typically at a temperature of about 300 to 400° F., from heat exchanger 19 into a first scrubber 21 of any conventional construction wherein the gas is scrubbed to remove dust particles and cooled to a temperature of about 100° F. to condense out water. Lines 22 carry cooling water into and away from the first scrubber. Gas leaves the first scrubber via a line 23 which has an outlet 24 for purging a portion to limit buildup of inerts. Line 23 carries the gas preferably into a second scrubber 25 wherein the gas is scrubbed with refrigerated water to cool the gas to about 60° F., and thus condense out more moisture. Lines 26 carry refrigerated water into and away from the second scrubber. It is possible to omit the second scrubber and introduce gas at a temperature of about 100° F. to the compressor, hereinafter described. However, we prefer to include this scrubber to cool the gas to about 60° F. to condense out more moisture, thereby decreasing the power required to operate the compressor.

A line 27 carries partially regenerated gas from the second scrubber 25 into a compressor 28 which compresses this gas to a pressure of about 20 to 100 p.s.i.g., and incidentally heats it back to about 200° F. A power recovery device 29, such as a turbine of conventional construction, supplies as much as possible of the power needed to operate the compressor, while a conventional drive 30 supplies the remainder. The power recovery device 29 is driven by fresh reducing gas, which is produced substantially water-free under a relatively high pressure of at least 20 atmospheres in conventional generating means, not shown. Fresh gas enters the system through a line 31 and passes first through heat exchanger 17, which may be located at any heat exchange position along line 20 but preferably is the first exchanger, and thence via a line 32 to the power recovery device. A line 33 carries the partially regenerated and compressed gas from compressor 28 to an after-cooler 34, which partially cools the gas to about 100° F. At this point, if carbon dioxide is to be removed, the gas passes through a conventional absorber, not shown. A line 35 carries the gas from the after-cooler 34 to a third scrubber 36 into which refrigerated water is introduced through lines 26 to cool the gas again to about 60° F. Because of the increased pressure, further moisture is condensed out as the gas again is cooled to this temperature (60° F.).

On leaving the third scrubber, the regenerated gas has a water content of less than 1 percent by volume, preferably less than about 0.35 percent. A line 37 carries the now fully regenerated and pressurized gas to exchanger 19, which heats it to a temperature of about 450° to 500° F. by heat exchange with off-gas from the reactor.

In an example of iron oxide reduction, heat exchanger 17 heats fresh reducing gas to a temperature of about 90° to 1000° F., which temperature intentionally is less than can be attained by exchange of heat with the off-gas in order not to overheat the power recovery device 29. The power recovery device expands and cools the fresh gas, which leaves via a line 38a at a pressure of about 40 to 50 p.s.i.g. and a temperature of about 450° to 500° F., values comparable with those for the regenerated gas leaving heat exchanger 19 via a line 38b. The two gases combine at this stage in a line 38, which carries the combined gases into heat exchanger 18. The combined gases have a water content of less than 0.5 percent by volume. Heat exchanger 18 heats the combined gases typically to a temperature of about 1000° to 1100° F. A line 39 carries the combined gases from heat exchanger 18 to the gas heater 14 which heats the gases to their final temperature prior to introduction to reactor 10.

One way of practicing our invention is illustrated by the following specific example, in which the metallic oxide comes from iron ore containing 97 percent $Fe_2O_3$ and the balance silicious gangue. Reduction of this oxide is performed in two steps, first to an intermediate product predominantly FeO and second to a final product predominantly metallic iron. The reducing gas introduced to the reactor 10 has approximately the composition:

| | Percent by volume |
|---|---|
| Hydrogen | 84.50 |
| Water | 0.255 |
| Inerts | 15.245 |

This gas is preheated in the heater 14 to about 1600° F., the ore is preheated to about 1700° F., and reaction temperatures of about 1300° F. are maintained. The gas is under a pressure of about 27.9 p.s.i.g. as it enters the reactor. On the basis of 100 pound mols per hour of $Fe_2O_3$ introduced to the reactor, about 1045 pound mols per hour of gas are introduced, and the controlling reaction:

$$FeO + H_2 \rightarrow Fe + H_2O$$

reaches about 72.6 percent of equilibrium.

Off-gas from the reactor is at a temperature of about 1300° F., a pressure of 14 p.s.i.g., and has approximately the following composition:

| | Percent by volume |
|---|---|
| Hydrogen | 57.3 |
| Water | 27.5 |
| Inerts | 15.2 |

As this gas passes through heat exchangers 17, 18 and 19, its temperature drops successively to about 1115° F., 625° F. and 325° F., and as it passes through the scrubbers 21 and 25, its temperature drops successively to about 100° F. and 60° F. In the scrubbers the water content drops successively to 4.25 percent and 1.235 percent. The compressor 28 raises the pressure of the gas from about 5 p.s.i.g. to about 49.5 p.s.i.g., and its temperature back to about 100° F. at the exit of the aftercooler 34. As the gas passes through the third scrubber 36, its temperature again drops to about 60° F. and its water content to about 0.353 percent. Heat exchanger 19 raises the temperature to about 480° F. After thus regenerating and purging, about 735 mols of gas remain.

310 mols of fresh reducing gas are introduced to the system at a temperature of about 100° F. and a pressure of about 420 p.s.i.g. and having approximately the following composition:

| | Percent by volume |
|---|---|
| Hydrogen | 98.5 |
| Water | Trace |
| Inerts | 1.5 |

Heat exchanger 17 raises the temperature of this gas to about 950° F. The power recovery device 29 lowers the temperature to about 481° F. and the pressure to about 44 p.s.i.g. Heat exchanger 18 heats the combined regenerated and fresh reducing gases to a temperature of about 1015° F.; consequently the gas heater 14 is required to heat the gas only by about an additional 600° F. The power recovery device 29 supplies approximately 40 to 50 percent of the energy needed to drive the compressor 28, thus materially decreasing the size of drive motor 30 and the power requirements therefor. By using the above arrangement of heat exchangers, we realize a maximum of heat recovery from the off-gas and a maximum conversion of heat energy into useable mechanical energy.

Heretofore the usual practice has been to cool off-gas only to about 100° F. to condense out water during the regeneration process, leaving water content of about 1.5 percent by volume in the off-gas. Consequently the water content of reducing gas entering the reactor (regenerated off-gas plus fresh gas) has been about 1.17 percent by volume. In reducing iron oxide to a 95 percent reduced product with gas of this water content and a reaction temperature of about 1300° F., we have not been able to reach any more than about 73 percent of equilibrium in the controlling reaction:

$$FeO + H_2 \rightarrow Fe + H_2O$$

If the reducing gas contains 15.2 percent inerts, as in the foregoing example, off-gas from this reaction has a water content of 18.6 percent by volume at a 73 percent approach to equilibrium. Water in the reducing gas thus causes a loss of 6.3 percent in the reducing capacity of the gas. By cooling the off-gas to 60° F. after compressing it, we lower the water content of gas introduced to the reactor (regenerated off-gas plus fresh gas) to about 0.255 percent by volume in the example. The loss in reducing capacity caused by water in the reducing gas is cut to about 1.37 percent, assuming the same approach to equilibrium.

From the foregoing description, it is seen that our invention increases the efficiency of a direct reduction process in several important respects, namely in utilization of sensible heat in off-gases, in utilization of inherent high pressure of fresh reducing gases, and in cutting the loss of reducing capacity of the gas resulting from its water content. These advantages are attained with a novel arrangement and combination of conventional devices.

While we have shown and described certain preferred embodiments of the invention, it is apparent that other modifications may arise. Therefore, we do not wish to be limited to the disclosure set forth but only by the scope of the appended claims.

We claim:
1. In a continuous direct reduction process, wherein reducing gas consisting mainly of hydrogen contacts iron oxide fines at a temperature of about 1200° to 1400° F., thereby reducing the oxide and oxidizing a portion of the hydrogen to water vapor, off-gas from the reducing step is regenerated by cooling it to condense out water and compressed, fresh reducing gas is combined with the regenerated gas, and the combined gases again contact oxide fines, a method of handling the gases to conserve energy represented by sensible heat in the off-gas and pressure in the fresh gas comprising exchanging heat between the off-gas and the fresh gas, between the off-gas and the combined gases, and between the off-gas and the compressed regenerated gas before the off-gas is cooled to condense out water, and obtaining energy for compressing the regenerated gas from pressure in the fresh gas and thereby expanding and cooling the fresh gas, the combining of regenerated and fresh gases taking place following the exchange of heat between the off-gas and the regenerated gas and following the expansion and cooling of the fresh gas.

2. In a continuous direct reduction process, wherein reducing gas consisting mainly of hydrogen contacts iron oxide fines at a temperature of about 1200° to 1400° F., thereby reducing the oxide and oxidizing a portion of the hydrogen to water vapor, off-gas from the reducing step is regenerated by cooling it to condense out water and compressed and a portion purged to limit build-up of inerts, fresh reducing gas is combined with the regenerated gas, and the combined gases again contact oxide fines, a method of handling the gases to conserve energy represented by sensible heat in the off-gas and pressure in the fresh gas comprising exchanging heat between the off-gas and the fresh gas, between the off-gas and the combined gases, and between the off-gas and the compressed regenerated gas, and obtaining energy from pressure in the fresh gas after exchange of heat with the off-gas for compressing the regenerated gas and thereby expanding and cooling the fresh gas, the combining of regenerated and fresh gases taking place following the exchange of heat between the off-gas and the regenerated gas and following expansion and cooling of the fresh gas.

3. A method as defined in claim 2 in which a portion of the cooling of the off-gas takes place following the exchanges of heat but before compression of this gas, and the remainder of the cooling of the off-gas takes place following compression.

4. In a continuous direct reduction process, wherein reducing gas consisting mainly of hydrogen contacts iron oxide fines at a temperature of about 1200° to 1400° F., thereby reducing the oxide and oxidizing a portion of the hydrogen to water vapor, off-gas from the reducing step is regenerated by cooling it to condense out water and compressed and a portion purged to limit build-up of inerts, fresh reducing gas is combined with the regenerated gas, and the combined gases again contact oxide fines, a method of handling the gases to conserve energy represented by sensible heat in the off-gas and pressure in the fresh gas comprising exchanging heat between the off-gas and the fresh gas, between the off-gas and the combined gases, and between the off-gas and the compressed regenerated gas, thereafter cooling the off-gas, compressing the cooled off-gas and incidentally heating it, cooling the compressed gas again thereby completing its regeneration, and obtaining energy for compressing the cooled off-gas from pressure in the fresh gas and thereby expanding and cooling the fresh gas, the combining of regenerated and fresh gases taking place following the exchange of heat between the off-gas and the regenerated gas and following expansion and cooling of the fresh gas.

5. In a continuous direct reduction process, wherein reducing gas consisting mainly of hydrogen contacts iron oxide fines at a temperature of about 1200° to 1400° F., thereby reducing the iron oxide and oxidizing a portion of the hydrogen to water vapor, off-gas from the reducing step is regenerated by cooling it to condense out water and compressed and a portion purged to limit build-up of inerts, fresh reducing gas is combined with the regenerated gas, and the combined gases again contact iron oxide fines, a method of handling the gases to conserve energy represented by sensible heat in the off-gas and pressure in the fresh gas comprising exchanging heat between the off-gas and the fresh gas, between the off-gas and the combined gases, and between the off-gas and the compressed regenerated gas, thereafter cooling the off-gas to about 60° F., compressing the cooled off-gas and incidentally heating it to about 200° F. by energy in part obtained from pressure in the fresh gas after exchange of heat with the off-gas, thereby expanding and cooling the fresh gas, and cooling the compressed gas again to about 60° F. thereby completing its regeneration, the combining of regenerated and fresh gases taking place following exchange of heat between the off-gas and the regenerated gas and following expansion and cooling of the fresh gas.

6. In a continuous direct reduction process, wherein reducing gas consisting mainly of hydrogen contacts iron oxide fines at an elevated temperature, thereby reducing the iron oxide and oxidizing a portion of the hydrogen to water vapor, off-gas leaves the reducing step at a temperature of about 1200° to 1400° F. and a pressure of 0 to 50 p.s.i.g. and is regenerated by cooling it to condense out water and compressed and a portion purged to limit build-up of inerts, fresh reducing gas produced at a pressure of at least 20 atmospheres is combined with the regenerated gas, and the combined gases heated to a temperature of about 1300° to 1600° F. and again contact iron oxide fines, a method of handling the gases to conserve energy represented by sensible heat in the off-gas and pressure in the fresh gas comprising exchanging heat between the off-gas and the fresh gas, between the off-gas and the combined gases, and between the off-gas and the compressed regenerated gas, thereafter cooling the off-gas to about 60° F., compressing the cooled off-gas and incidentally reheating it to about 200° F., cooling the compressed gas to about 60° F. thereby completing its regeneration, and obtaining energy from pressure in the fresh gas after exchange of heat with the off-gas for compressing the regenerated gas and thereby expanding and cooling the fresh gas to a pressure and temperature comparable with the regenerated gas following its heat exchange with the off-gas, the combining of regenerated and fresh gases taking place following the exchange of heat between the off-gas and the regenerated gas and following expansion and cooling of the fresh gas.

7. In a continuous direct reduction apparatus which includes a reactor, means for feeding preheated metallic oxide to said reactor and for discharging reduced product therefrom, a gas heater, an inlet for introducing preheated reducing gas from said heater into said reactor, an outlet for removing off-gas from said reactor, and means for supplying fresh reducing gas, the combination therewith of a gas handling apparatus comprising at least three heat exchangers in series connected to receive off-gas from said outlet, cooling means connected to receive off-gas from the last heat exchanger of said series for condensing out water therefrom, a compressor connected to receive gas from said cooling means for compressing and incidentally heating the cooled off gas, cooling means connected to receive gas from said compressor for condensing out more water therefrom and thus completing its regeneration, one heat exchanger of said series being connected to receive gas from said second named cooling means for reheating the regenerated gas from sensible heat in the off-gas, another heat exchanger of said series being connected to receive gas from said fresh gas supplying means for heating fresh gas from sensible heat in the off-gas, and expanding and cooling means connected to receive fresh gas from said last mentioned heat exchanger, a third heat exchanger of said series being connected to receive combined regenerated gas from said one heat exchanger and fresh gas from said expanding and cooling means for heating the combined gases from sensible heat in the off-gas, said heater being connected to receive combined gas from said third heat exchanger.

8. A combination as defined in claim 7 in which said expanding and cooling means includes a turbine drivingly connected to said compressor.

9. In a continuous direct reduction apparatus which includes a reactor, means for feeding preheated metallic oxide to said reactor and for discharging reduced product therefrom, a gas heater, an inlet for introducing preheated reducing gas from said heater into said reactor, an outlet for removing off-gas from said reactor, gas cooling and compressing means for regenerating the off-gas, and means for supplying fresh reducing gas and combining it with regenerated off-gas, the combination therewith of a gas handling apparatus comprising first, second and third heat exchangers in series connected to receive off-gas from said outlet, said cooling means including a scrubber connected to receive off-gas from said third heat exchanger, said compressing means being connected to receive gas from said scrubber, said cooling means including another scrubber connected to receive gas from said compressing means, said third heat exchanger being connected to receive gas from said second named scrubber for reheating this gas from sensible heat in the off-gas, said first heat exchanger being connected to receive gas from said fresh gas supplying means for heating fresh gas from sensible heat in the off-gas, and a turbine connected to receive fresh gas from said first heat exchanger and expand and cool the fresh gas, said second heat exchanger being connected to receive combined regenerated gas from said third heat exchanger and fresh gas from said turbine for heating the combined gases from sensible heat in the off-gas, said heater being connected to receive combined gas from said second heat exchanger.

10. A combination as defined in claim 9 in which said turbine is drivingly connected to said compressing means.

References Cited in the file of this patent

UNITED STATES PATENTS

| | | |
|---|---|---|
| 2,107,549 | Schmalfeldt | Feb. 8, 1938 |
| 2,142,100 | Avery | Jan. 3, 1939 |
| 2,547,685 | Brassert et al. | Apr. 3, 1951 |
| 2,584,570 | Messinger et al | Feb. 12, 1952 |
| 2,671,765 | McGrath et al. | Mar. 9, 1954 |
| 2,752,234 | Shipley | June 26, 1956 |